(12) United States Patent
Lundy et al.

(10) Patent No.: US 7,277,691 B1
(45) Date of Patent: Oct. 2, 2007

(54) METHOD AND SYSTEM FOR MANAGEMENT OF CALL TONES

(75) Inventors: Michael T. Lundy, Olathe, KS (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 91 days.

(21) Appl. No.: 11/090,346

(22) Filed: Mar. 24, 2005

(51) Int. Cl.
*H04M 9/00* (2006.01)

(52) U.S. Cl. ............ 455/401; 379/201.01; 379/207.13; 345/827

(58) Field of Classification Search ............. 455/412.1, 455/412.2, 414.1, 567, 432.2; 379/142.01, 379/207.16
See application file for complete search history.

(56) References Cited

U.S. PATENT DOCUMENTS

| | | | |
|---|---|---|---|
| 5,423,058 A | 6/1995 | Cudak et al. | |
| 6,731,738 B1 | 5/2004 | Qiu et al. | |
| 6,889,044 B1 | 5/2005 | Cook | |
| 7,035,675 B2 * | 4/2006 | Yamada | 455/567 |
| 7,123,903 B2 * | 10/2006 | Seki | 455/414.1 |
| 2004/0093376 A1 * | 5/2004 | De Boor et al. | 709/203 |
| 2004/0119755 A1 * | 6/2004 | Guibourge | 345/827 |
| 2004/0174983 A1 | 9/2004 | Olschwang et al. | |
| 2004/0253993 A1 | 12/2004 | Nakamura | |
| 2005/0094796 A1 * | 5/2005 | Beauford | 379/211.01 |
| 2005/0105706 A1 * | 5/2005 | Kokkinen | 379/201.01 |
| 2005/0107128 A1 * | 5/2005 | Deeds | 455/567 |
| 2005/0143054 A1 | 6/2005 | Fogel | 455/415 |
| 2005/0175161 A1 * | 8/2005 | Reynolds et al. | 379/88.17 |
| 2005/0207555 A1 * | 9/2005 | Lee et al. | 379/207.16 |
| 2006/0029202 A1 * | 2/2006 | Koskela | 379/142.01 |
| 2006/0126815 A1 * | 6/2006 | Hahm et al. | 379/252 |
| 2006/0147017 A1 * | 7/2006 | Moody et al. | 379/211.02 |
| 2006/0160579 A1 * | 7/2006 | Ure | 455/567 |
| 2006/0165059 A1 * | 7/2006 | Batni et al. | 370/352 |

* cited by examiner

*Primary Examiner*—William Trost
*Assistant Examiner*—Julio Perez

(57) ABSTRACT

A method for management of call tones (tones that a caller hears when they call a party) is described which is particularly suitable for use by wireless telephones. The management of call tones can by performed off line. The method includes a step of: a) downloading a call tone and associated identification data to the wireless telephone (e.g., downloaded from a call tone website); b) establishing, on the wireless telephone a correlation between the call tone identification data and a contact entry stored in memory on the wireless telephone; and c) transmitting a message from the phone to a network server that includes the correlation established in step b). Subsequently, when a telephone associated with the contact entry calls the wireless telephone the call tone is provided to the calling telephone.

12 Claims, 3 Drawing Sheets

METHOD AND SYSTEM FOR MANAGEMENT OF CALL TONES

FIELD OF THE INVENTION

The present invention relates generally to the field of telephony, and more particularly to methods and systems for management of call tones on a telephone handset.

BACKGROUND

A "call tone", for purposes of this disclosure, is the ringing signal that a caller hears when the caller is calling someone else and the party they are calling has not yet answered. An element in a telephone network plays the call tone to the caller when a call is being set up. For example, many phone networks in this country provide a call tone in the form of a ringing sound that lasts for a second or two, followed by a pause of a second or two, followed by another ringing tone that lasts for a second or two, etc.

The telephone art has now evolved to the point that some telephone companies provide a service wherein a particular subscriber (e.g., Joe) can purchase call tones such that when a party (e.g., Mary) calls Joe, Mary hears a distinctive ringing pattern other than the generic call tone pattern described above. Further, the service may allow Joe to have another party (Frank) hear a different call tone when Frank calls Joe. For example, the call tone Mary hears when she calls Joe could be a series of tones that define a first melody or tune (e.g., "Mary Had a Little Lamb"), and the call tone that Frank hears when he calls Joe would be a different series of tones that define a second melody or tune (e.g., "Take Me Out to the Ball Game").

Presently, such call tone service is obtained by telephone customers (e.g., Joe in this example) via the web, either through a wired or wireless web connection. The customer goes online, purchase a call tone (ring tone pattern), references an online phone book (e.g., one stored for the user), and associates the purchased tone with particular entries in the online phone book. Nothing is downloaded to the phone. The purchased call tone would typically expire after a certain period of time. For instance, it may be good for only two weeks of use.

Aspects of this invention provide more convenient methods for organizing and managing call tone service, which are particularly useful for wireless telephones such as cell phones and personal communications system (PCS) phones. Unlike the prior art approaches, aspects of the illustrated embodiments of this invention provide for management of the call tones and assignment of call tones locally on the wireless phone, and automatic update of telephone network servers of call tone assignments. Usage of Web sites for call tone management is limited to only the initial purchase of the call tones. The rest of the management activity is typically performed off line.

SUMMARY

In a first aspect, a method is provided for management of call tones on a wireless telephone. The method includes the step of a) downloading a call tone and associated identification data for the call tone to a wireless telephone. The downloading can be done from a web site, and if so this is preferably the only web interaction needed by the user. For ease of explanation, this summary will use the example of Joe's wireless telephone performing call tone management such that when Frank calls Joe, Frank hears a particular tone pattern that has been selected by Joe. Joe downloads the call tone and associated call tone identification data onto his wireless phone.

The method continues with a step b) of establishing, on the wireless telephone, a correlation between the call tone identification data and a contact entry (e.g., the phone number for Frank in the present example) is stored in memory on the wireless telephone. This step is preferably performed using interactive techniques with the user interface and display on the telephone. For example, Joe views a display of the list of his contacts (Frank, Mary, etc.), highlights a particular contact (Frank) and selects a call tone for Frank and then clicks an OK icon, takes an Enter action, or performs some other user interface action to signify that Joe wants Frank's phone to be associated with a particular call tone. This interactive process can be prompted by software resident on the phone or downloaded from the web site onto Joe's phone when the call tone was originally purchased.

The method further includes a step c) of transmitting a message from the wireless phone (Joe's phone) to a network server. The message contains the correlation established in step b). The correlation information is propagated to other network elements that input call tones to a phone line when a call is made. Subsequently, when a telephone associated with the contact entry (Frank's phone) calls the wireless telephone, the call tone is provided to the telephone and Frank hears the tone pattern that was associated with him.

This message from Joe's phone to the network server can be transmitted in a variety of forms or using a variety of protocols, the details of which are not particularly important. In one possible embodiment, an HTTP POST message is sent to the network server containing the data indicating the associations between call tones and contacts (telephone numbers). This information is preferably provided to pertinent telephone network elements such that when the contact entries call the wireless telephone they hear the call tones that were assigned. This step c) is preferably performed automatically by the wireless telephone, that is, without requiring specific user involvement to initiate transmission of the message. This simplifies the process and avoids extra user steps.

In other aspects and in preferred embodiments, a schedule may be associated with the correlation between the call tone and the contact entry. For example, a schedule may be assigned to Frank's contact entry whereby a particular call tone will be heard by Frank only if he calls during a certain time of day or day of the week. This schedule data will be assigned on the wireless phone (using interactive techniques) and is uploaded to the network server automatically when the message in step c) is sent.

The process described for associating Franks' contact with a particular tone can of course be done for a plurality of different contacts. Each contact might have a different call tone assigned to it. Alternatively, each contact could have the same call tone. As yet another alternative, some contacts could have the same call tones assigned and others could have unique call tones. There are, of course, multiple combinations and permutations that are possible, depending on the number of call tones that are downloaded to the wireless telephone and the number of contacts on the wireless telephone. As another possibility, the user can organize their contacts into one or more groups and assign a call tone to each group. As still another possibility, the software on the phone may include a "shuffle" feature wherein call tones are randomly assigned to one or more contacts.

In a preferred embodiment, the call tones are downloaded onto the wireless phone such that they can be accessed and played locally on the wireless telephone "off-line", e.g., when the phone is not otherwise active. The user can listen to each of the tones and then decide which tone to assign to each contact. One possible screen display on the phone is shown in the drawings which includes features that allow a user to scroll through their contacts, and select particular call tones to assign to each contact, thereby easing the selection process. Other screen displays that provide the same functionality but in a different layout or arrangement of graphical user interface devices is of course possible.

In another aspect, the call tone that is downloaded in step a) includes data indicating an expiration date for the call tone. When a telephone associated with the contact entry (e.g., Frank's phone) calls the wireless telephone after the expiration date, the call tone is not provided to the telephone. Instead, Frank would hear the standard or generic ring pattern. The expiration date for a call tone may be displayed to the user on their phone. If the user were to attempt to assign an expired call tone to a contact, an error message may be displayed. In another possible embodiment, when the call tone has expired, it could be removed from the handset. The network server will use the expiration date for a call tone to determine whether a party calling the user hears the call tone or the generic call tone. In other words, the network server (and possibly other network elements) store the expiration date data along with the call tone assignments and uses the expiration date data to determine whether or not to play the call tone for the calling party.

In still another possible embodiment, it may be possible to change the call tone assignments from a device other than the wireless telephone, such as from a personal computer with Internet access. For example, the subscriber uses their computer at home to access a web page hosted by a network server. The network server is managed by their telephone service provider. The web page contains their profile for their wireless phone, including contacts, call tones purchased and available, and other information (e.g., accounting information). Using interactive software (e.g., a web browser), the subscriber updates their profile and makes new assignments or changes for call tones to their contacts. The method in this regard further includes a step of transmitting a message (e.g., SMS or other type of message) from the network server to the wireless telephone indicating the changed call tone assignments. This message is processed locally on the phone so as to change the correlations locally on the wireless telephone, keeping it up to date with the changes made on line from the home computer.

In still another aspect, a system for facilitating management of call tones is provided comprising a network server adapted for providing a plurality of call tones to wireless telephones. The network server includes software instructions for transmitting to the wireless telephones a set of data when the call tones are provided. The set of data includes a) at least one call tone; and b) identification data for the call tone. In preferred embodiments, the phone already comes equipped with interactive software for allowing call tone assignments. In an alternative but less preferred embodiment, the network server could also transmit to the phone an executable file (e.g., a Java handling application) for processing by the wireless telephone. The file contains code for generating a call tones folder whereby the user of the wireless telephone may interactively assign call tones to contact entries stored locally on the wireless telephone.

The set of data may also include at least one of a default ringer, an expiration date for the at least one call tone, and a link for use in subsequently obtaining additional call tones.

In still another aspect, an improvement is provided to a wireless telephone having a processor and a display. The improvement comprises interactive call tone management software comprising a set of instructions for execution by the processor. The instructions include a) instructions for displaying one or more contact entries on the telephone display; b) instructions for playing a call tone such that it is audible to a user of the telephone; c) instructions for presenting on the telephone display an icon or other instructions wherein the user may associate the call tone with a contact entry in the one or more contact entries; and d) instructions generating a message containing data pertaining to the association of the call tones to the contact entry and transmitting the message over an air interface to a server on a telephone network for storage and usage by the telephone network, such that subsequently when a telephone associated with the contact entry calls the wireless telephone the call tone is provided to the telephone.

BRIEF DESCRIPTION OF DRAWINGS

A representative example of how the invention may be practiced is shown in the drawings, in which.

DETAILED DESCRIPTION

Figure 1:
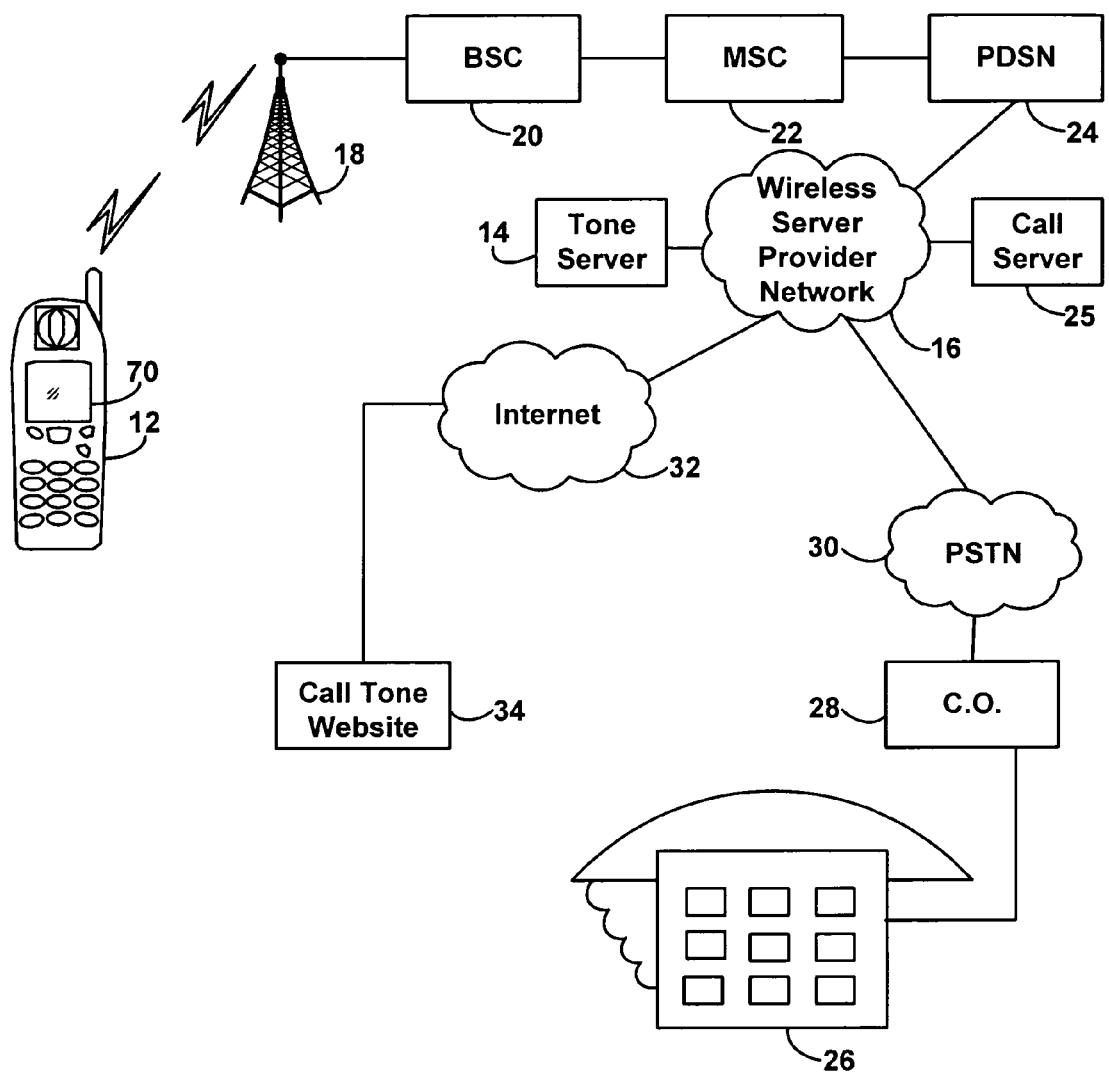
FIG. 1 is a network diagram showing a representative network environment in which the invention may be practiced.

Referring now to the Figures, FIG. 1 is a network diagram showing a representative network environment in which the invention may be practiced. A subscriber (Joe) has a cellular telephone 12 and subscribes to a wireless services provided by a service provider such as XCingular, Sprint, Verizon, or other provider. The service provider provides a call tone service that allows the subscriber to purchase call tones and assign call tones to particular callers. The call tone management is performed by the user off-line, with the user interacting with call tones on the wireless phone 12. For example, the subscriber downloads the call tones onto their phone, accesses their contacts, and assigns call tones to particular contacts. When the process is complete, a message is sent from the telephone 12 to a network server 14 connected to the telephone network service provider 16. The message includes the associations between the call tones and particular contacts. These call tones are propagated to other network entities such that when the contact using telephone 26 calls Joe, they here the call tone that Joe assigned to them.

Thus, in a first aspect we provide a method for management of call tones, comprising the steps of: a) downloading a call tone and associated identification data to a wireless telephone 12 (e.g., downloaded from the call tone website 34); b) establishing, on the wireless telephone 12, a correlation between the call tone identification data and a contact entry stored in memory on the wireless telephone; and c) transmitting a message from the phone 12 to a network server 14 containing the correlation established in step b); wherein, subsequently when a telephone 26 associated with the contact entry calls the wireless telephone 12 the call tone is provided to the telephone 26.

The network environment of FIG. 1 includes a conventional cellular network infrastructure, including a wireless base station antenna 18, a base station controller (BSC) 20, a mobile switching center (MSC) 22 and a Packet Data Serving Node 24. These details are not important. The PDSN couples the MSC and BSC to the wireless service provider backbone network 16, which is typically a packet switched internet protocol network.

The network environment include a call server 25 which is a network element that inputs call tones onto the communication path between the phone 26 and the wireless phone 12. For example, Frank's phone 26 may be a land line phone which is connected to a telephone company central office switch (CO) 28, and a Public Switched Telephone Network (PSTN) 30. When a call from phone 26 is directed to a wireless customer, the call is directed onto the wireless network 16. Since, in this situation, special call tones are used for the caller phone 26, call server 25 inputs the tones so that the caller using phone 26 hears them. Obviously, the task of adding call tones could be performed by other network elements in either the wireless network 16, or in the PSTN 30, or by the central office 28. The particular entity that inputs the call tones is not particularly important.

The wireless phone 12 preferably includes a web browser and communications software to allow the user of the wireless phone 12 to access the Internet. The phone connects to the Internet 32 via the cellular telephone infrastructure (elements 18, 20 and 22 and 24) and the wireless service provider network 16. The user accesses a call tone web site 34. The call tone website allows a user to interactively select different call tones, listen to them, and purchase them. The purchased call tones are preferably downloaded onto the phone 12 so that the person can later listen to them and go through the process, described below, of assigning particular call tones to particular contacts.

In one embodiment, a software application is downloaded to the wireless device that handles the entire shopping experience. This application could, for example, link automatically to the web site 34, prompt the user to preview the call tones, and facilitate the purchase and download of the call tones. The software application could also include a set of instructions to set up a call tones folder, provide user interface prompts to assign call tones to contacts, and provide for changing call tones, grouping contacts and assigning call tones to groups of contacts, and uploading contact assignments to the network server 14. In one possible embodiment, this software application is resident on the phone 12 at the time of manufacture and initial distribution of the phone 12. As another possibility, the application could be transmitted over the air interface from the wireless network to the phone 12 during a software upgrade session.

As another example, a software application for assigning and managing call tones on the phone 12 could be downloaded from the web site 34 at the time the user access the web site 34 or when they make a purchase of the call tones.

Figure 2:
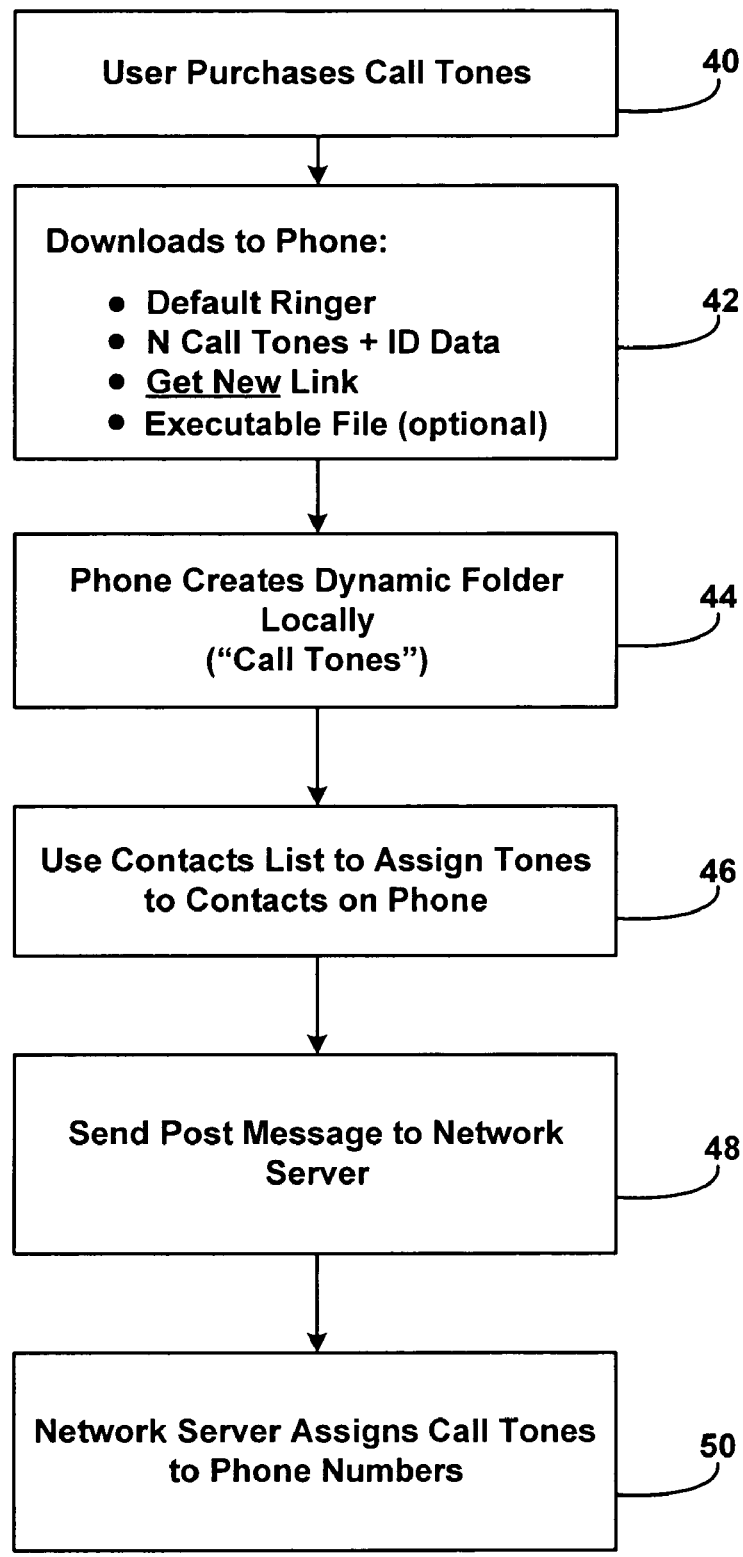
FIG. 2 is a flow chart showing the process of downloading call tones and correlating tones to contacts, and updating a network server.

FIG. 2 is a flow chart showing the process of downloading call tones and correlating tones to contacts, and updating a network server.

At step 40, the user of the phone 12 purchases call tones. This process preferably occurs by the user of the phone 12 accessing the call tones web site 34, listening to the tones that are available, and making appropriate selections. There is typically a purchase option that is displayed on the web site 34 and the user navigates through the purchase option to purchase the call tones, e.g., with a credit card. If the web site 34 is provided by the wireless carrier to which the phone 12 is a subscriber, the purchase option may simply take the form of confirming the selection and adding the pertinent charge to the subscriber's account.

At step 42, a download occurs between the web site 34 and the phone 12. The download may include the following elements:

1) A default ringer, i.e., a tone pattern that is the same as the standard, generic ring pattern used in telephony in the United States. The default ringer can be used to assign a contact entry back to regular call tone (no call tone service for that contact).

2) N call tones (where N is the number of call tones the user selected for purchase), along with identification data for each call tone. Each call tone is assigned a unique ID (e.g., numerical sequence). This ID is used later for the correlation with particular contacts and also used the network elements when specific call tones are applied to particular callers.

3) a Get New link. The Get New link is a link to the website 34 that the user would later select to go back to the website to update their call tones or select new ones.

4) Executable files (optional). The download could be accompanied with a executable file (e.g., Java handler application) that would load on the phone 12 and provide instructions for the user to interactively assign call tones to particular contacts, manage the call tones, and provide reporting of call tone assignments to the network server 14. This executable file may not be needed if the software performing these operations is already native on the device or downloaded in a software upgrade session.

At the conclusion of step 42, the user has the call tones they have purchased resident on their phone 12 and can now listen to them and assign them to contacts off-line, without being connected simultaneously to the web site 34.

At step 44, software resident on the phone creates a dynamic folder, which may be named "call tones" or some other suitable name. The call tones folder provides a convenient place for storage of the call tones so that the user call navigate through the screen displays on their phone 12 and access the call tones and listen to them.

Figure 4:
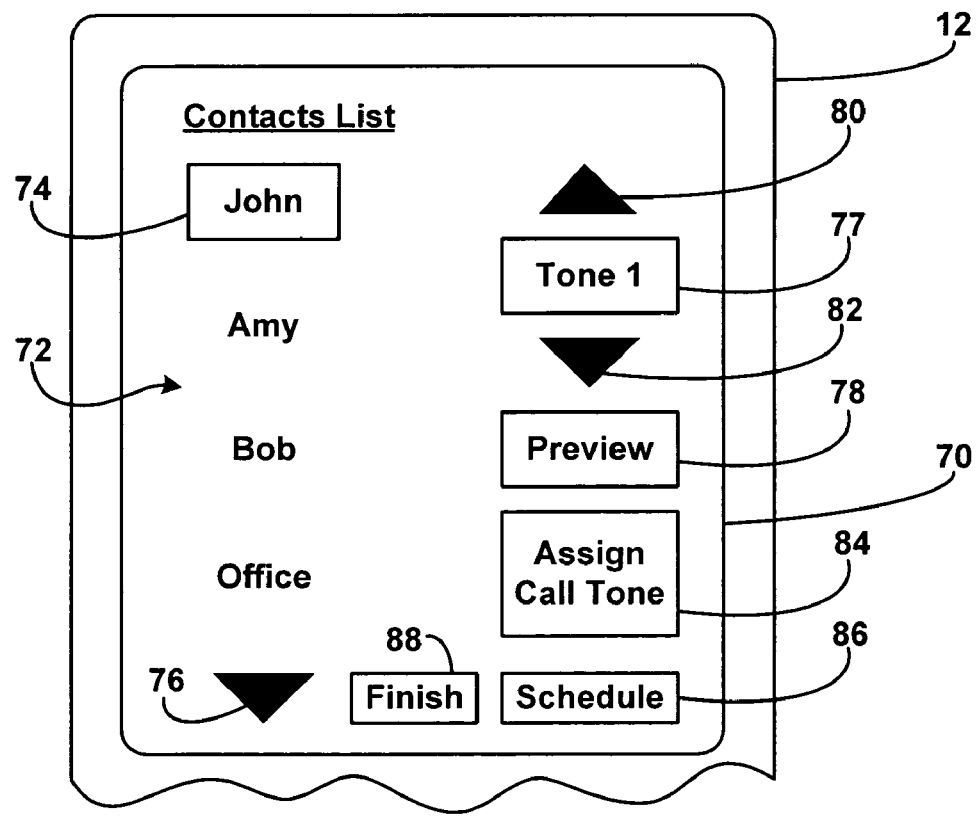
FIG. 4 is a representative user interface on a wireless phone showing icons which allow a user to assign a call tone to a particular contact.

At step 45, the user accesses their contacts list and assigns call tones to contacts. This action is performed preferably on the phone 12. The contacts list is a list of a phone numbers that represent the user's frequent contacts, e.g., friends, family, co-workers, other businesses, etc. The phone includes interactive software to display the contacts, listen to the call tones resident on the phone 12, and assign tones to contacts. An example of this action is shown in FIG. 4, described subsequently.

The call tone assignment application may include a special settings feature, wherein the user can access special settings for the call tones from a menu. These special settings could include a shuffling setting or feature whereby the tones are initially assigned to particular contacts, and the call tones are periodically changed at random to new call tones. As another example, the special setting could assign an instrumentation selection, sound effect, or other sound or musical variation to a particular call tone.

At step 48, after the user has completed the process of assigning call tones to contacts, and any special settings, a message is sent from the phone 12 to the network server 14. This message contains the association between individual contacts and call tones (represented by the unique call tone identifier data). This message can be manually sent by the user of the phone 12, or it can be sent automatically. For example, after the user has completed the call tone assignment task, the user could be prompted with a question such as "finished?" and invited to enter either YES or NO. If the user indicates YES, the software application on the phone generates a message comprising the phone number to call tone identifier assignments, adds appropriate headers to the message, and then queues up the message in a message buffer (memory). The message is sent when the user exits the call tone folder or at the next available opportunity when the phone is not otherwise in use.

The message sent at step 48 can be sent in a variety of formats. One such format is an HTTP POST message, wherein the message is posted to the network call tone server 14.

At step 50, the call tone server 14 receives the message and performs an assignment in memory of call tone ID numbers to particular contacts (phone numbers). This information can also be propagated to other network elements that need the call tone assignments, e.g., the call server 25 of FIG. 1, which play the call tones back to the callers of the subscriber phone 12.

Figure 3:
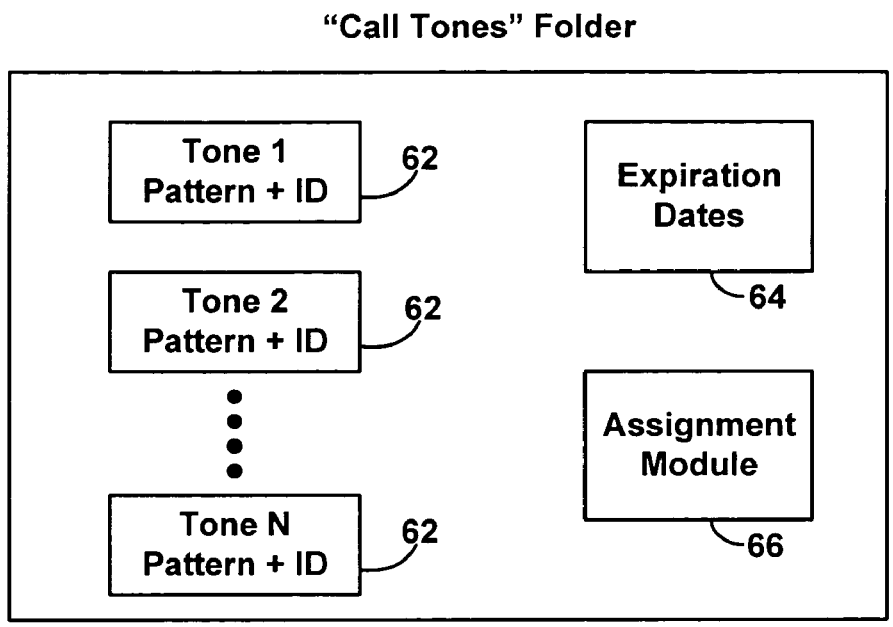
FIG. 3 is an illustration of the elements of a call tones folder resident on the wireless telephone.

FIG. 3 is an illustration of the elements of a call tones folder 60 resident on the wireless telephone, generated in step 44. The call tone folder 60 is a data structure which includes the following elements:

(1) N files 62 each containing call tone patterns and associated call tone ID data. The call tones could be stored in any suitable digital form, such as .wav format, MP3 format, etc.

(2) an expiration date file 64 containing expiration dates for each of the N call tones stored in files 62.

(3) an assignment module 66 comprising a set of program instructions for creating user interface displays that displays contact information and call tones, and allows the user to use the user interface of the phone 12 to make call tone assignments.

FIG. 4 shows one possible user interface display on the screen 70 on a wireless phone 12 showing icons which allow a user to assign a call tone to a particular contact. The user interface design is not critical and can vary widely from the disclosed example. The screen shows the contacts 72 and a scroll bar 74 which highlights the current contact that is selected. The user toggles down the list of contacts 72 to select each one. Additional contacts are available by selecting the arrow 76. When the user has selected a particular contact with the scroll bar 74 (here, "John"), the user then toggles through the list of available call tones to see which one to assign to the contact. The user interface displays the current tone selection "tone 1" as indicated at 77. By selecting "preview" 78 they can listen to the call tone pattern for the current call tone selection. By using the up and down arrows 80 and 82 they select different call tones. When they are ready to assign the call tone, they activate the assign call tone icon 84. If they want to assign specific scheduling to the call tone assignment, they activate the scheduling icon 86. There are other graphical user interface devices beyond icons that could be used for call tone assignment, such as by using a hard button or key on the phone, etc.

When they are finished with call tone assignment, they activate the "Finish" icon 88. This action triggers the generation of a message listing all the contacts (phone numbers) and call tone assignments and the transmission of the message to the tone server 14 (FIG. 1.)

It will be apparent that other features could be added and other displays used to assign call tones to contacts, including displays to group contacts and assign a call tone to all members of the group, displays to assign special settings to the call tones, and displays to change current call tone assignments. These user interface details are not particularly important and wide variation is possible from the illustrated embodiment without departure from the scope of the invention. Furthermore, these details are well within the ability of persons skilled in the art and detailed descriptions on how to achieve these features and functionality is not necessary.

As noted previously, the call tone that are downloaded may include data indicating an expiration date for the call tone. When a telephone associated with the contact entry (e.g., Frank's phone) calls the wireless telephone after the expiration date, the call tone is not provided to the telephone. Instead, Frank would hear the standard or generic ring pattern. The displays provided on the phone 12 preferably include displays to view the expiration dates.

In still another possible embodiment, it may be possible to change the call tone assignments from a device other than the wireless telephone, such as from a personal computer with Internet access. For example, the subscriber uses their computer at home to access a web page hosted by a network server, e.g., a server connected to the wireless service provider network in FIG. 1. The network server is provided by their telephone service provider, and could for example be the call tone server 14. The web page contains their profile for their wireless phone, including contacts, call tones purchased and available, and other information (e.g., accounting information). Using interactive software (e.g., a web browser), the subscriber updates their profile and makes new assignments or changes for call tones to their contacts. The method in this regard further includes a step of transmitting a message (e.g., SMS or other type of message) from the network server to the wireless phone 12 indicating the changed call tone assignments. This message is processed locally on the phone 12 so as to change the correlations locally on the wireless telephone 12, keeping it up to date with the changes made at the network server.

In still another aspect, a system for facilitating management of call tones is provided comprising a network server 14 adapted for providing a plurality of call tones to wireless telephones. The network server includes software instructions for transmitting to the wireless telephones 12 a set of data. The set of data includes a) at least one call tone; and b) identification data for the call tone. An optional executable file may also be downloaded for processing by the wireless telephone, the file containing software instructions or code for generating a call tones folder whereby the user of the wireless telephone may interactively assign call tones to contact entries stored locally on the wireless telephone. Examples of the call tones folder are shown in FIGS. 3 and 4 and described above.

As shown and described above in FIG. 2, the set of data may also include at least one of a default ringer; an expiration date for the at least one call tone; and a link (e.g., URL) for use in subsequently obtaining additional call tones.

In still another aspect, an improvement is provided to a wireless telephone 12 having a processor (conventional, not shown) and a display 70 (FIG. 4). The improvement comprises interactive call tone management software comprising a set of instructions for execution by the processor. The call tone management software may take the form of the assignment module 66 of FIG. 3 and in alternative embodiments may be separate from the call tones folder data structure 60. As explained above in conjunction with FIG. 4, the instructions include a) instructions for displaying one or more contact entries on the telephone display; b) instructions for playing a call tone such that it is audible to a user of the telephone; c) instructions for presenting on the telephone display an icon or other instructions wherein the user may associate the call tone with a contact entry in the one or more contact entries; and d) instructions generating a message containing data pertaining to the association of the call tones to the contact entry and transmitting the message over an air interface to a server on a telephone network for storage and usage by the telephone network, such that subsequently when a telephone associated with the contact entry calls the wireless telephone the call tone is provided to the telephone.

Variations from the specifics of the disclosed preferred embodiments are of course possible. The scope of the invention is to be determined by reference to the appended claims.

We claim:

1. A method for management of call tones, comprising the steps of:
   a) downloading a call tone and associated identification data to a wireless telephone;
   b) establishing, on the wireless telephone, a correlation between the call tone identification data and a contact entry stored in memory on the wireless telephone;
   c) transmitting a message to a network server containing the correlation established in step b);
   d) changing the correlation of the call tone to a second contact entry from a device separate from the wireless telephone;
   e) transmitting a message to the wireless device indicating the changed correlation; and
   f) processing the message so as to change the correlation locally on the wireless telephone;
   wherein, subsequently when a telephone associated with the second contact entry calls the wireless telephone the call tone is provided to said telephone associated with the second contact entry.

2. The method of claim 1, further comprising the step of playing the call tone on the wireless telephone prior to performing step b).

3. The method of claim 1, wherein the step a) is performed as a result of the wireless telephone accessing a web site and ordering the call tones from the web site.

4. The method of claim 1, wherein the call tone downloaded in step a) includes data indicating an expiration date for the call tone, wherein when a telephone associated with the contact entry calls the wireless telephone after the expiration date the call tone is not provided to the telephone.

5. The method of claim 1, wherein step c) is performed automatically by the wireless telephone without requiring specific user involvement to initiate transmission of the message.

6. The method of claim 1, wherein in step b) call tones are randomly assigned to one or more contact entries.

7. In a wireless telephone having a processor and a display, the improvement comprising:
   interactive call tone management software comprising a set of instructions for execution by the processor, the instructions comprising:
   a) instructions for displaying one or more contact entries on the wireless telephone display;
   b) instructions for playing a call tone such that it is audible to a user of the wireless telephone; and
   c) instructions wherein the user may associate the call tone with a contact entry in the one or more contact entries by operation of a graphical user interface device; and
   d) instructions generating a message containing data pertaining to the association of the call tone to the contact entry and transmitting the message over an air interface to a server on a telephone network for storage and usage by the telephone network, such that subsequently when a telephone associated with the contact entry calls the wireless telephone the call tone is provided to the telephone associated with the contact entry;
   and wherein the instructions further comprise a set of instructions implementing a shuffling feature wherein call tones are randomly assigned to one or more contact entries.

8. The improvement of claim 7, wherein a schedule is associated with the correlation between the call tone and the contact entry.

9. The improvement of claim 7, wherein the message transmitted to the server further includes data associated with the schedule.

10. The improvement of claim 7, wherein the instructions are obtained from as a result of the wireless telephone accessing a web site and ordering one or more call tones from the web site.

11. The improvement of claim 7, wherein the call tone is associated with data indicating an expiration date for the call tone, wherein when a telephone associated with the contact entry calls the wireless telephone after the expiration date the call tone is not provided to the telephone.

12. The improvement of claim 7, wherein the instructions include a set of one or more special setting instructions for application of special settings to the call tones.

* * * * *